United States Patent [19]

Powell et al.

[11] Patent Number: 4,474,284

[45] Date of Patent: Oct. 2, 1984

[54] DOUBLE PITCH MECHANICAL TRANSFER DRIVE

[75] Inventors: Thomas A. Powell; Kenneth O. Kolnes, both of Rockford, Ill.

[73] Assignee: Ex-Cell-O Corporation, Troy, Mich.

[21] Appl. No.: 378,559

[22] Filed: Jun. 17, 1982

[51] Int. Cl.³ ............................................. B65G 25/00
[52] U.S. Cl. ................................... 198/742; 198/741; 414/749
[58] Field of Search ............... 198/472, 621, 648, 736, 198/738, 741, 742, 747; 74/50, 104; 414/749, 750

[56] References Cited

U.S. PATENT DOCUMENTS

1,205,895 11/1916 Hoyt ........................................ 74/50
4,016,984 4/1977 Pipes ..................................... 414/749
4,018,328 4/1977 Galarowic et al. .................. 198/741

Primary Examiner—Robert J. Spar
Assistant Examiner—Jonathan D. Holmes
Attorney, Agent, or Firm—John C. Evans

[57] ABSTRACT

A drive mechanism for an automatic transfer machine has a mechanical transfer drive including a motor driven gear box with an output shaft connected to a single, rotatable drive arm with cam follower means thereon selectively engageable with one or the other of a pair of spaced cam slots on a transfer buggy to define a linear geneva index for producing a harmonic motion, two stroke, transfer of the transfer buggy so as to produce improved start-stop-start-stop sequences of movement of pallets in a linear geneva operated transfer system.

3 Claims, 13 Drawing Figures

FIG.11

DOUBLE PITCH MECHANICAL TRANSFER DRIVE

FIELD OF THE INVENTION

This invention relates to transfer machines and more particularly to transfer machines having two-stage transfer systems with unequal strokes and start-stop-start-stop transfer sequences.

DESCRIPTION OF THE PRIOR ART

Transfer machines of the type shown in U.S. Pat. No. 3,473,645, issued Oct. 21, 1969, include a single bar transfer system with two different stroke lengths produced by a hydraulic cylinder drive. Such drives, while suitable for their intended purpose, are linear and do not have harmonic motion for smooth start-stop-start-stop motions as desired in many transfer systems.

Various proposals have been suggested to obtain harmonic drive in transfer machines.

U.S. Pat. No. 4,256,218 issued Mar. 17, 1981, includes a barrel cam having an axially curved cam positioned between cam followers to produce transfer motion and an interposed toothed wheel and offset cams are rotated by a fixed rack to transfer the drive motion to a second platform. Such a system includes a number of components and a drive path not readily adaptable to in-line, multiple station, engine block transfer machines.

U.S. Pat. No. 4,016,984 issued Apr. 12, 1977 includes a gear train which has cam followers mounted on spur gears driven by opposed racks. The cam followers engage cam channels on a shuttle assembly. Rotation of the spur gears imparts harmonic drive to the shuttle assembly. While suitable for load handling apparatus the drive system is complicated and expensive because of all the moving parts and is difficult to service.

SUMMARY OF THE INVENTION

The present invention provides, in one working embodiment, a mechanical transfer machine drive which produces a double pitch transfer including means for selectively driving small operating stations on a short pitch motion of the drive in a transfer machine having reduced length and reduced cost.

The double pitch drive is provided by an inexpensive, easily assembled mechanical system which eliminates the need for expensive gear and machined cam barrel rotary to reciprocating motion drive components.

Furthermore, the inventive double pitch drive includes a single rotatable arm with dual output rollers on cam followers selectively engageable with a drive buggy to produce (1) exceptionally smooth acceleration of the buggy to mid-stroke and exceptionally smooth deceleration to end of stroke; (2) accurate adjustment of drive components for extended periods of machine operation; and (3) a drive having few parts and low cost.

OBJECTS OF THE INVENTION

An object of the present invention is to provide an improved low cost double pitch mechanical drive system for a transfer machine having first and second sets of in-line operating stations, the drive system having a single rotatable arm with cam follower rollers on opposite ends selectively engageable with spaced cam grooves on a drive buggy to impart perfect harmonic drive motion transmitted to the buggy to drive it linearly during a start-stop-start-stop sequence for selectively driving the first and second sets of in-line operating stations.

Another object of the present invention is to provide an improved transfer machine having first and second sets of operating stations and two sets of pallets selectively connected to a transfer bar and wherein the transfer bar is connected at one end thereof to a double pitch mechanical drive by means including a single, rotatable arm to provide smooth harmonic motion velocity and acceleration curves and desired start-stop-start-stop sequences of pallet drive.

Still another object of the present invention is to provide an improved mechanical drive for use in mechanical transfer machines including a motor-driven power transfer unit having an output shaft connected to a single, rotatable drive arm; the drive arm having asymmetrically located cam rollers thereon to define unequal length cranks on the drive arm; and wherein a drive buggy has a pair of spaced cam rollers groove means thereon selectively engaged by the drive arm to convert constant speed rotary motion of the drive arm to harmonic linear motion of the drive buggy. This harmonic linear motion moves through a first start-stop sequence having a first travel pitch and a second start-stop sequence having a second travel pitch.

Yet another object of the present invention is to provide an improved transfer machine having first and second sets of operating stations and two sets of pallets selectively connected to a transfer bar and wherein the transfer bar is connected to a linear geneva mechanical drive including a motor-driven power transfer unit having an output shaft connected to a single, rotatable drive arm; the drive arm having asymmetrically located cam rollers thereon to define unequal length cranks on the drive arm; and wherein a drive buggy has a pair of spaced cam groove means thereon selectively engaged by the drive arm cam rollers to produce motion of the drive buggy in a linear path through a first start-stop sequence having a first travel pitch and a second start stop sequence having a second travel pitch.

These and other objects of the present invention will be clear to those skilled in the art from the succeeding detailed description and drawings of one preferred embodiment.

DETAILED DESCRIPTION OF THE DRAWINGS

Figure 1:
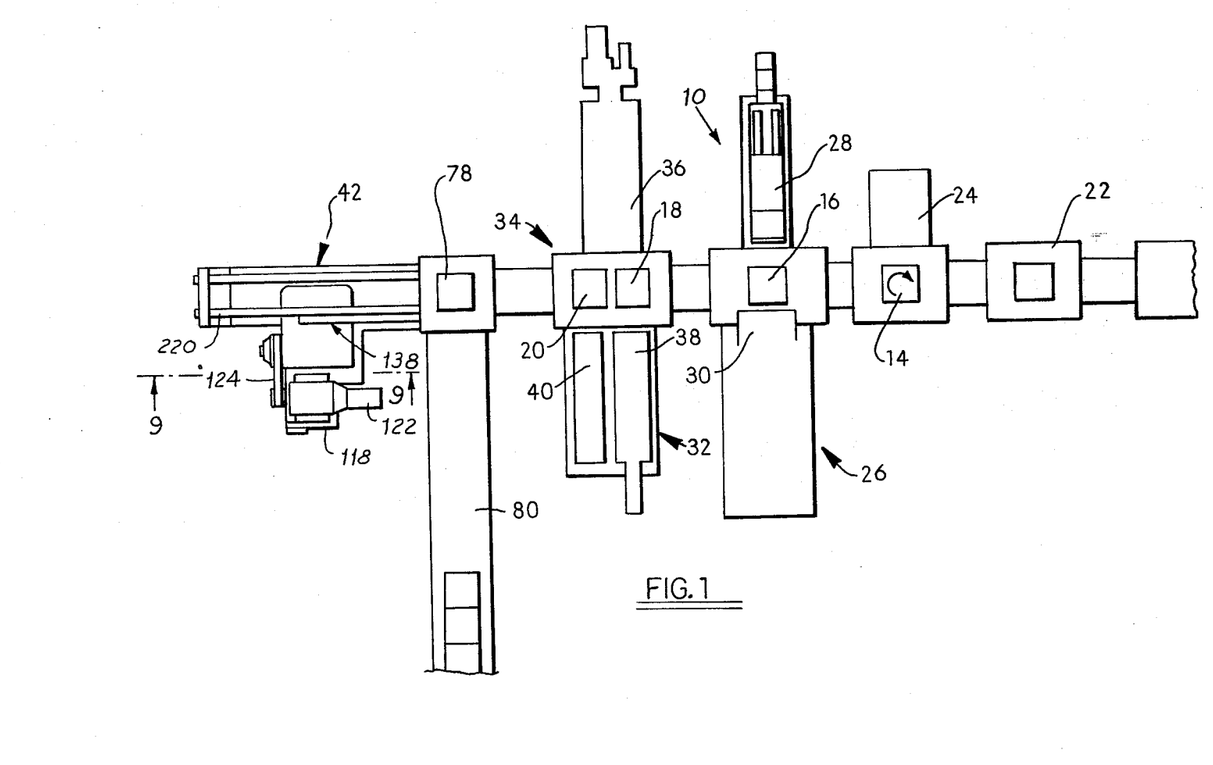
FIG. 1 is a schematic top elevational view of a transfer machine including the present invention.

Referring to FIG. 1, a portion of the pallet transfer machine including the present invention is indicated generally by reference numeral 10. The illustrated portion of the pallet transfer machine 10 is part of a thirty-four pallet transfer machine. Five pallets 12, 14, 16, 18 and 20 are illustrated. Pallet 12 is located at future work station 22. Pallet 14 is located at a wire brush station 24. Pallet 16 is located at a work station 26 which has a right hand side located horizontal head drill spindle assembly 28 and a left hand vertical head mill spindle assembly 30. Pallets 18 and 20 are located at work stations 32 and 34. Station 32 has a right hand horizontal head drill spindle assembly 36 and a left hand horizontal head drill spindle assembly 38. Station 34 has a left hand horizontal head top spindle assembly 40 and the horizontal head drill spindle assembly 36.

The work stations are representative of work stations found in pallet transfer machines of the type improved by use of a double pitch mechanical transfer drive 42 which is coupled to a transfer bar system 44 for advancing pallets with respect to the work stations.

Figures 2, 3:
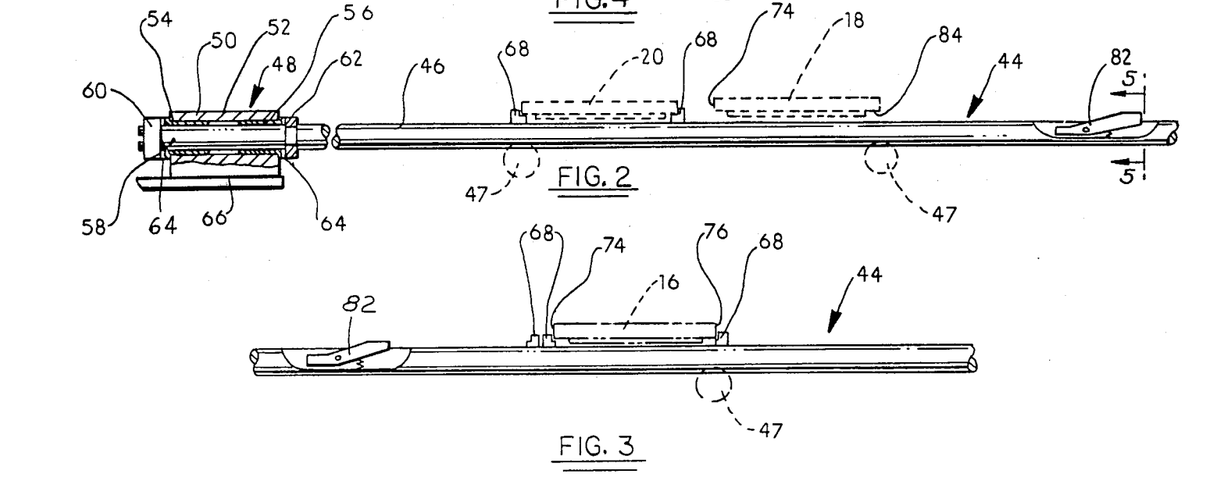
FIGS. 2 and 3 are fragmentary elevational views of a transfer bar component of the machine in FIG. 1.

A portion of the transfer bar system 44 is shown in FIGS. 2 and 3.

A transfer bar 46 extends below each of the pallets and is supported at spaced points by rollers, such as roller 47 in FIG. 2. A connector drive 48, shown in FIG. 2, has a block 50 with a bore 52 therethrough. Liner bushings 54,56 at either end of bore 52 receive the end 58 of transfer bar 46. An end cap 60 is secured by screws to end 58 of transfer bar 46. A split collar 62 is fixed to a turned groove in 46. Cap 60 and Collar 62 form a drive trap for block 50. Spacers 64 are fit for drive position and size to eliminate backlash. The block 50 is welded to a transfer drive unit plate 66.

Figure 6:
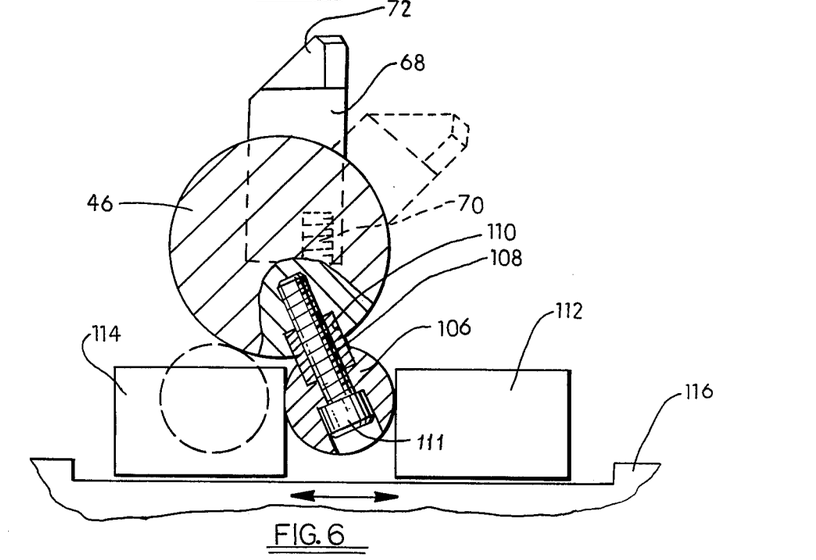
FIG. 6 is an enlarged sectional view of solid dog and rotate bar components on the transfer bar.

The transfer bar 46 has a plurality of solid dogs 68, some pushers and some retainers, fixedly secured thereto by screws 70. One such dog 68 is shown in FIG. 6. As seen in FIGS. 2 and 3 the spacing of dogs 68 corresponds to the length of pallets 12–20 so that tips 72 on each dog 68 will engage end surfaces 74,76 on opposite ends of each pallet when the transfer bar is moved to a predetermined transfer position.

The solid dogs 68 as shown in FIGS. 2 and 3 are in engagement with pallets 16 and 20 prior to a transfer bar advance which will move pallet 20 to a corner station 78 (by moving in 2 steps). From station 78, the pallets are transferred to conveyor 80 arranged ninety degrees to the axis of transfer bar 46. Simultaneously, pallet 16 and other pallets at preselected numbers of work stations are transferred to the next work station in the transfer machine 10.

In one working embodiment, the aforesaid advance constitutes a thirty-six inch pitch advance movement of the mechanical transfer drive 42. During this first pitch movement a latch dog assembly 82 moves across the bottom 84 of pallet 18 to be positioned against the leading end surface 74 of pallet 18. A solid dog 68 will be positioned to contact the following end surface 76 of pallet 18.

Figure 4:
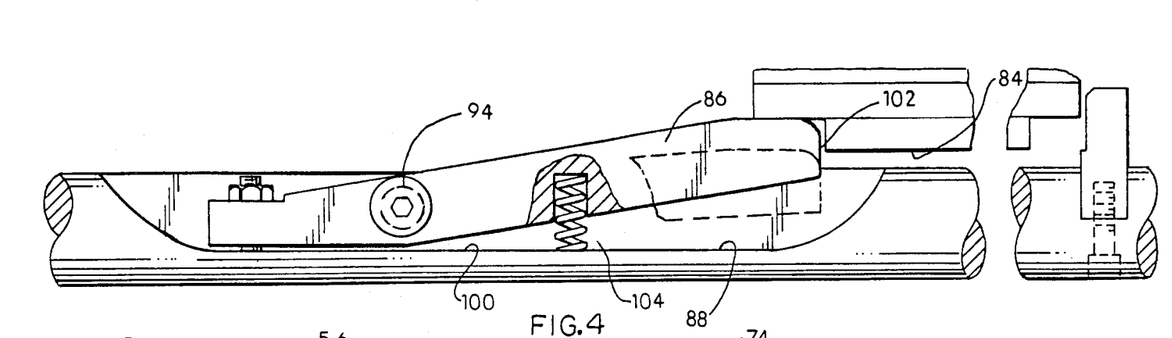
FIG. 4 is an enlarged, side elevation view of a spring biased latch dog on the transfer bar of FIG. 2.
Figure 5:
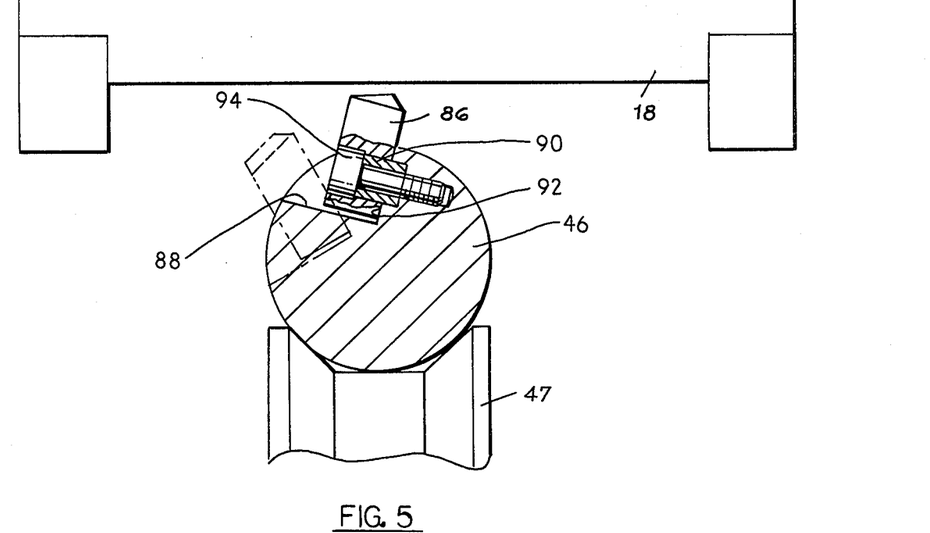
FIG. 5 is an enlarged sectional view taken along the line 5—5 of FIG. 4 showing the latch dog in pallet engaged and pallet disengaged positions.

As shown in FIGS. 4 and 5, the latch dog 86 is a pivoted dog located within a slot 88 in the transfer bar 46. FIG. 5 is shown from the part going direction. Latch dog 86 is held to the bar wall 92 by a socket head shoulder bolt 94. A set screw 96 is threaded through an inboard end 98 of latch dog 86. It is adjusted to control the "up" position of latch dog 86 on bar 46. A spring 104 biases dog 86 into its pallet retainer position. The spring 104 will compress as latch dog 86 pivots into the broken line position in FIG. 4 as it passes under pallet 18.

Once the transfer bar is advanced 36 inches, the pallets 12–20 are all engaged by either solid dogs 68 or latch dogs 86.

In accordance with the present invention, the mechanical drive is operated through a second pitch of eighteen inches to move all of the dog engaged pallets.

As shown in FIG. 6, (part coming direction) the transfer bar 46 has a rotate bar 106 connected by a key 108 seated in a slot 110 in the bar 46 and held in place by screws 111. The rotate bar 106 is located between abutments 112,114 fixed to a reciprocating bar rotation actuator 116. The details of actuator 116 form no part of the present invention. Such actuators to rotate transfer bars so as to locate dogs thereon into and out of locked relationship with pallets are well known to those skilled in the art.

During a given machine cycle the actuator 116 rotates transfer bar 46 into a pallet lock position wherein the spring latch dogs 82 and solid dogs 68 are in the solid line positions of FIGS. 5 and 6 to engage opposite ends of the pallet. During other cycles the actuator 116 is conditioned to shift abutments 112,114 so as to shift spring latch dogs 86 and solid dogs 68 into the dotted line positions of FIGS. 5 and 6 wherein the transfer bar can be returned to the beginning of a transfer operation.

Referring now to FIGS. 7–13, the illustrated double pitch transfer drive 42 is a mechanical system of the linear geneva type which, in accordance with the present invention, is readily adaptable to drive transfer bars and connected pallets with exceptionally smooth acceleration to mid-stroke. In the illustrated part of machine 10, the pallets 12, 14, 16 and 20 are examples of other pallets in the system. These pallets are moved from the position shown in FIGS. 2 and 3 to a position halfway (mid-stroke) through the 36 inch pitch movement. Thereafter the pallets 12, 14, 16 and 20 decelerate to a stop position at the end of thirty-six inches of pallet travel. The drive 42 then picks up the short stroke pallets, such as pallet 18, at a second start position and completes a second distinct stroke having a pitch of eighteen inches to a second stop position. The drive eliminates the need for two transfer bar systems and has no adjustments susceptible to drift. Furthermore, it does not require expensive machined barrel cams to convert rotary movement to linear drive of a transfer system.

Figure 7:
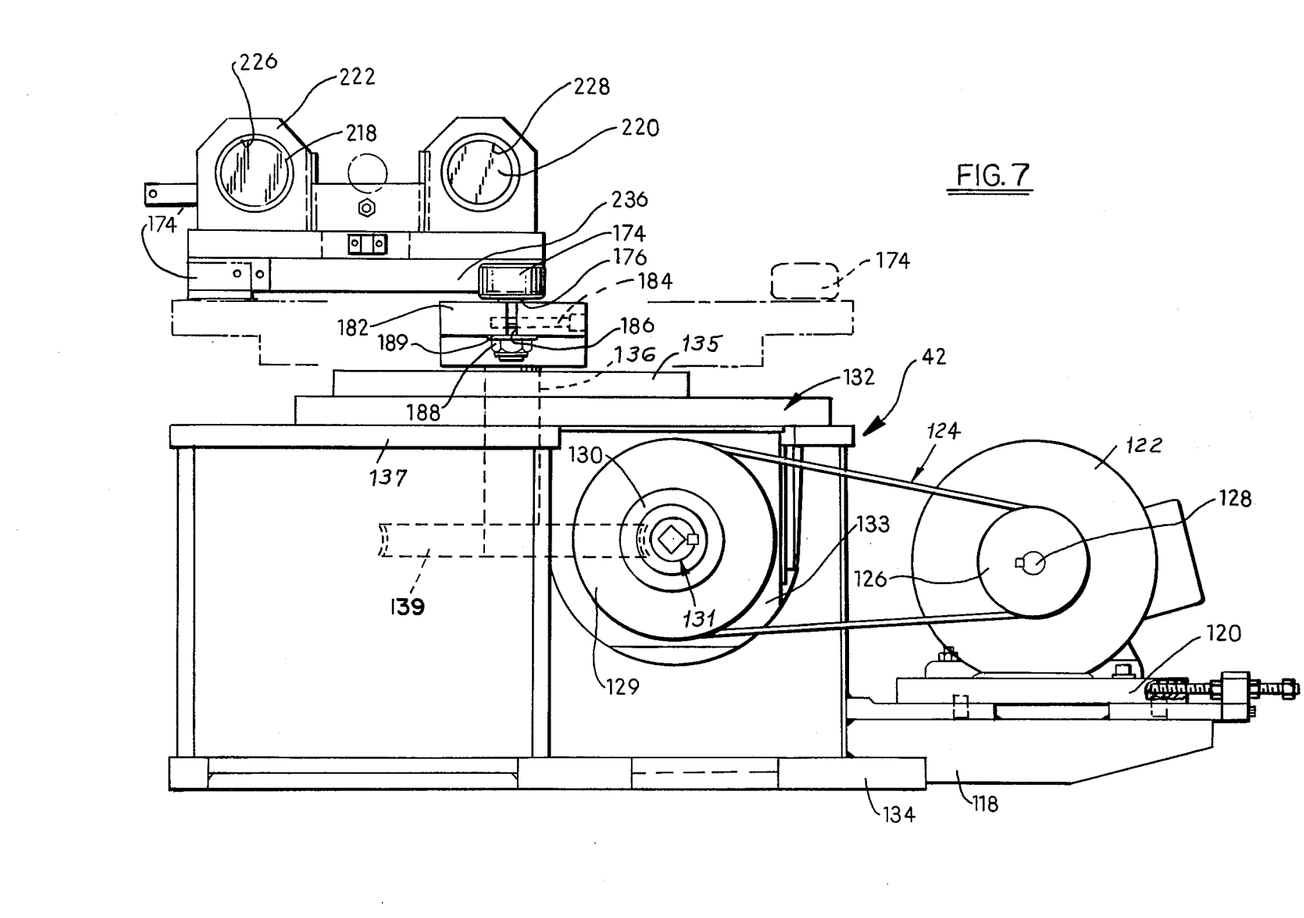
FIG. 7 is an end elevational view of a double pitch mechanical transfer drive of the present invention.

As shown in FIG. 7, the drive 42 includes a base 118 having an adjustable motor mounting plate 120. A two speed drive motor 122 is connected to plate 120. A positive drive belt 124 is driven by an output pulley 126 on the output shaft 128 of motor 122. Belt 124 is connected to a pulley 129 connected through a torque limiter clutch 130 to the input shaft 131 of a gear box assembly 132. Housing 133 of assembly 132 is secured to main base 134 and has a flange 135 connected to a drive platform 137. An output worm gear 139 of the gear box assembly 132 is connected to an output shaft 136.

An output shaft 136 is connected to a single drive arm 138. The arm 138 has a drive shaft bore 140 with side slots 142,144. A square key 146 carried by shaft 136 is fit into a keyway 148 in arm 138. The arm 138 is clamped to shaft 136 by clamp screws 150,152 which are screwed through arm 138 at slots 142,144 to contract the arm 138 against shaft 136 after the shaft 136 is inserted in bore 140.

Figure 9:
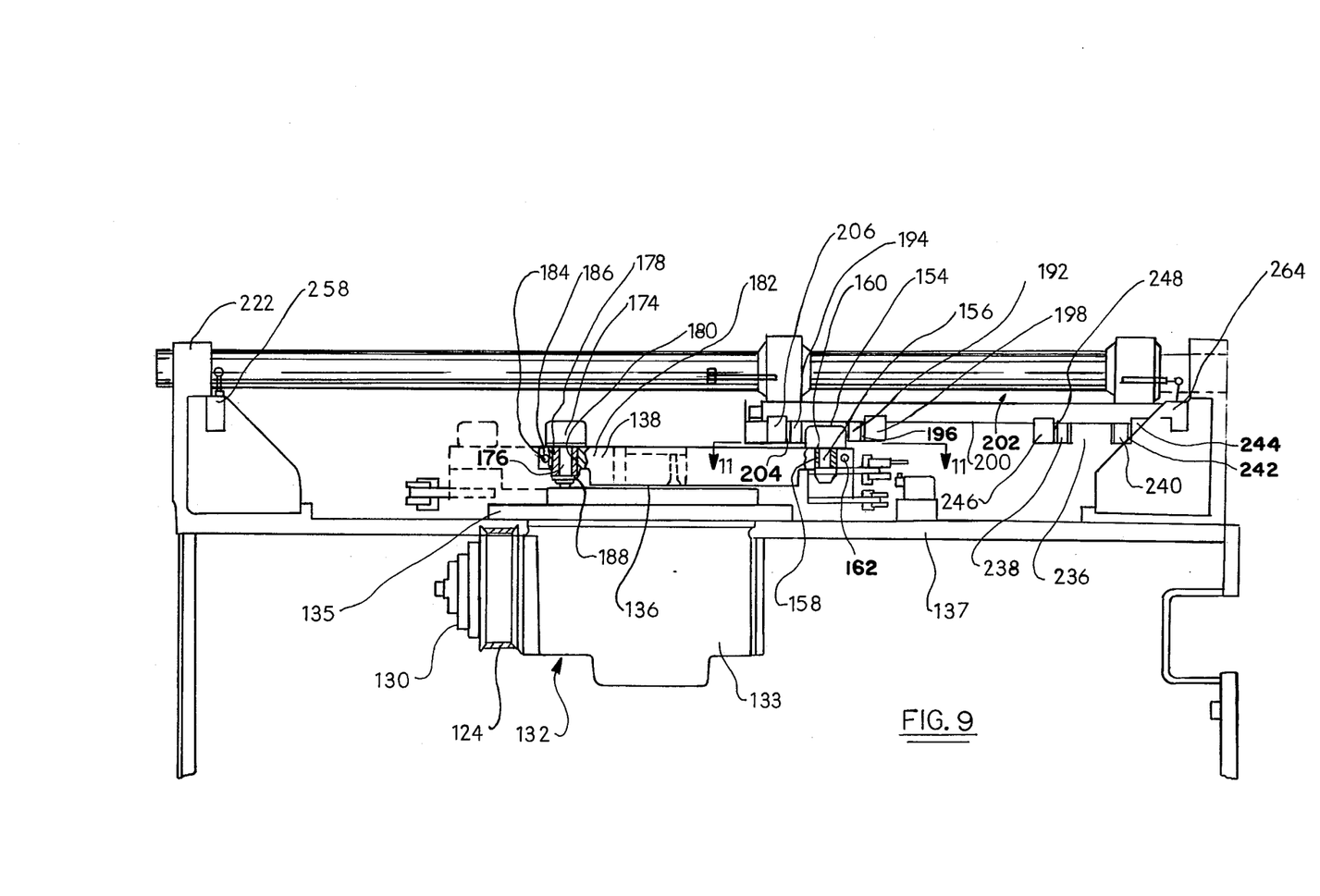
FIG. 9 is a side-elevational view of the FIG. 7 drive.
Figure 12:
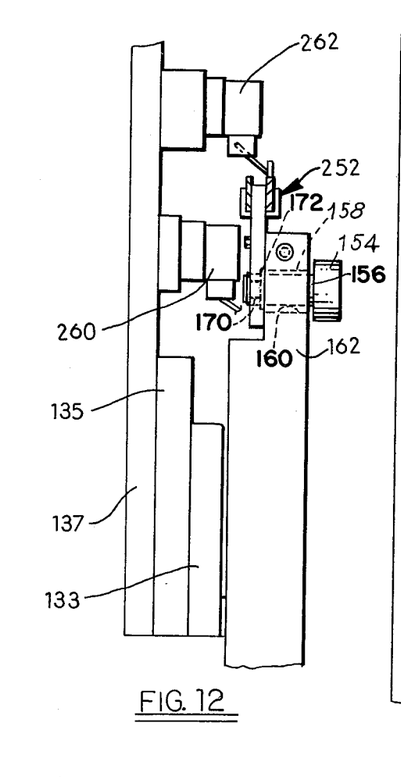
FIG. 12 is a side view of the limit switch dog in the FIG. 10 operative position.
Figure 13:
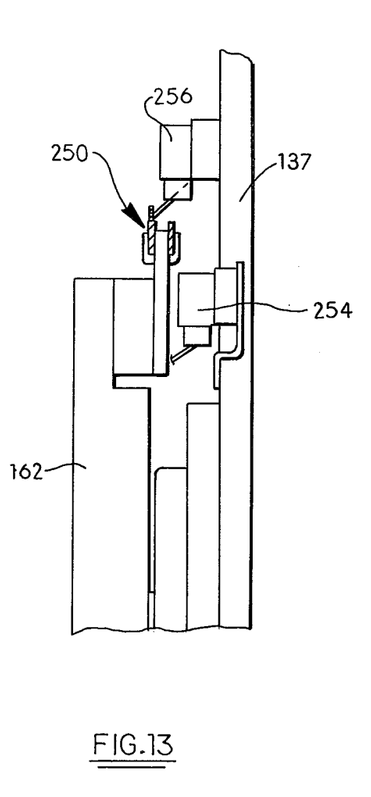
FIG. 13 is a side view of the limit switch dog in its FIG. 11 position.

A first cam roller 154, best shown in FIGS. 9 and 12, has a shaft 156 supported by an eccentric sleeve 158 in a bore 160 at one end 162 of drive arm 138. A slot 164 in end 162 is provided to tighten arm end 162 against sleeve 158 when a clamp screw 166 is tightened into a threaded hole 168. A lock nut 170 and washer 172 are secured to a threaded end of shaft 156 to hold the roller 154 in place on arm 138.

A second cam roller 174, best shown in FIGS. 7 and 9, has its shaft 176 directed through an eccentric sleeve 178 in a bore 180 at the opposite end 182 of drive arm 138. Sleeve 178 is held in place by a clamp screw 184 which threads into end 182 to close an end slot 186 to tighten end 182 against the sleeve. A lock nut 188 and washer 189 engage a threaded end of shaft 176 to hold the cam roller 174 in place.

Figure 8:
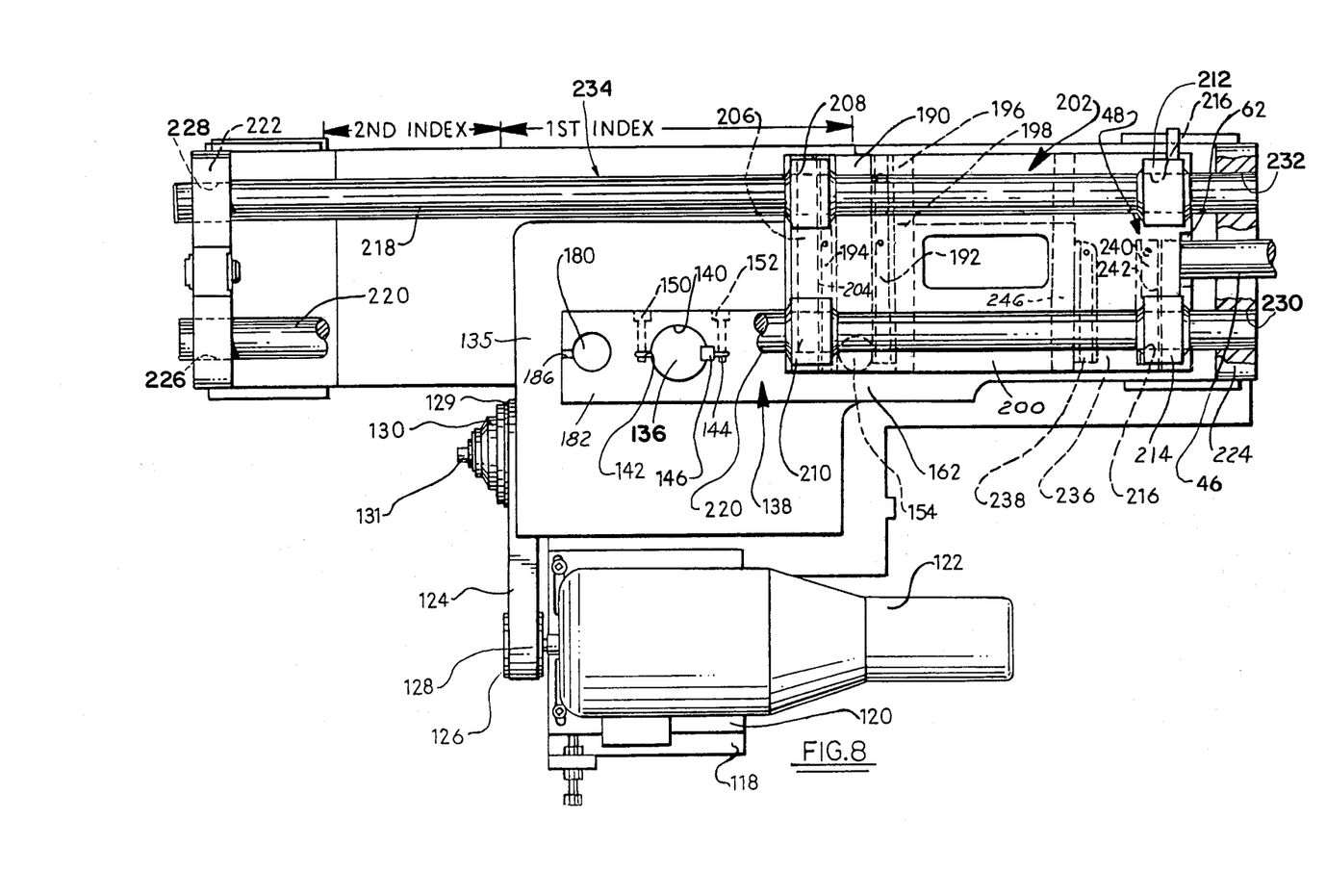
FIG. 8 is a top elevational view of the drive of FIG. 7 with plates broken away to show cam guide strip components thereof.

In the illustrated arrangement the cam rollers 154,174 are arranged asymmetrically with respect to the vertical axis of output shaft 136. In FIG. 8 the cam roller 154 is shown located at the entrance of a cam slot formed by a pair of spaced guide strips 192,194. Guide strip 192 is located against a fitting spacer 196 which abuts a mounting block 198 secured to a lower plate 200 of a movable buggy 202. Guide strip 194 also engages a fitting spacer 204 and mounting block 206 on plate 200.

The movable buggy 202 has a pair of end members 208,210 and 212,214 at opposite ends of plate 200. The members 208–214 each have a bore 216 through which fixed parallel guide bars 218,220 are directed. The bars 218, 220 define a track for buggy 202. Piers 222,224 at opposite ends of platform 137 have spaced holes 226,228 and 230,232, respectively, to receive opposite ends of the bars 218,220 so as to locate the bars to define a track system 234 on which the buggy reciprocates during machine operation.

In addition to cam slot 190 the buggy has a cam slot 236 defined by spaced guide strips 238,240 on the underside of plate 200. Strip 240 is positioned and held in place by a fitting spacer 242 and mounting block 244. Strip 238 is positioned and held in place by fitting spacer 246 and mounting block 248. The cam roller 174 engages the entrance to cam slot 236 when the arm 138 is rotated clockwise as viewed in FIG. 8.

Additionally, the drive arm 138 carries limit switch dogs 250,252 that move with respect to limit switches 254,256,258,260 to produce a selective control of the drive motor 122.

SEQUENCE OF OPERATION

Figure 10:
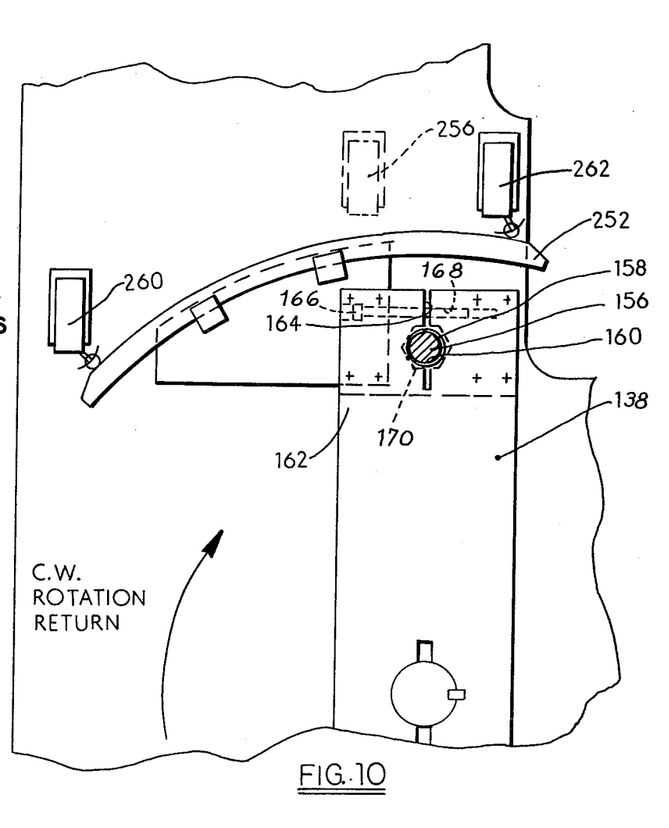
FIG. 10 is an enlarged fragmentary sectional view taken along the line 10—10 of FIG. 9 looking in the direction of the arrows.
Figure 11:
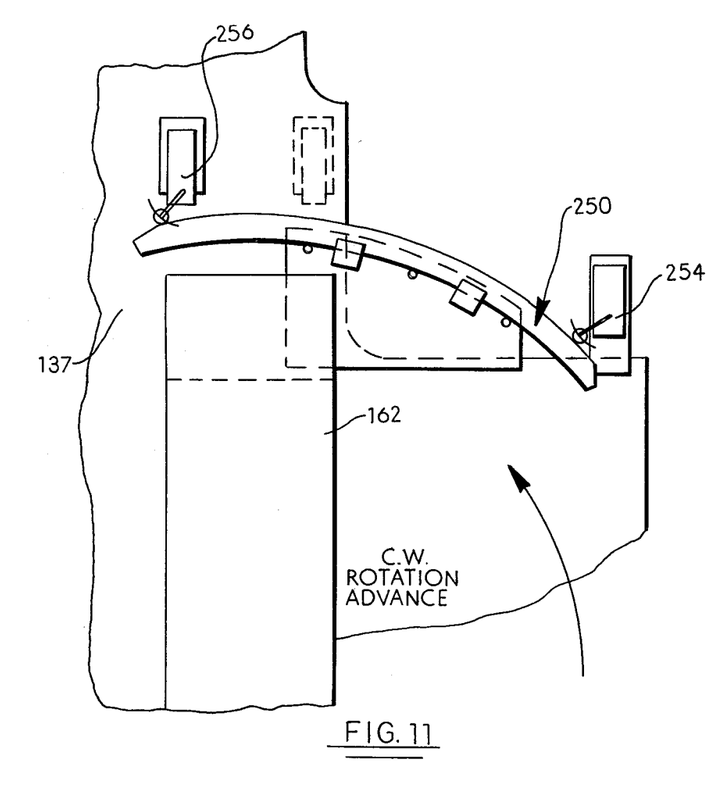
FIG. 11 is a view like FIG. 10 showing the limit switch dog in a second operative position.

More specifically, as shown in FIG. 11, initial counterclockwise rotation of drive arm 138 will be at high motor speed. Near the end of 360° crank movement the limit switch dog 250 trips limit switch 254 to condition the motor circuit to shut down the rapid speed output of motor 122. The drive arm 138 continues to be driven counterclockwise at the lower speed until limit switch 256 and frame limit switch 258 are tripped. Then the motors 122 is conditioned for reverse rotation of drive arm 138 at high speed. Drive arm 138 rotates clockwise 360° during return of buggy 202 and, as shown in FIG. 10, dog 252 will trip limit switch 260 which shuts down the rapid motor. The drive continues to run at slow speed until limit switch 262 and buggy return limit switch 264 are tripped at the end of the return of buggy 202.

One representative operating mode includes a long pitch advance of pallet 20 and pallets 12,14,16. At this point (before transfer) in the operation of the mechanical transfer drive 42, cam roller 154 is located as shown in FIG. 8. Counterclockwise rotation of drive arm 138 (as viewed in FIG. 8) will cause the cam roller 154 to follow a 180° arc and remain within the cam slot 190 thereby to drive the buggy 202 through a first index of 36 inch pitch. The drive is a harmonic motion which produces a desired smooth acceleration to mid stroke, and thereafter smooth deceleration to the end of the first index. At the end of the thirty-six inch stroke produced by 180 degrees of rotation of drive arm 138, the cam roller 174 enters the entrance of cam slot 236. The drive arm 138 then drives the buggy 202 through a second index having a pitch of eighteen inches.

During the second, shorter stroke a small number of additional pallets (those at dual work stations) are connected to the transfer bar system 44. The cam roller 174 generates harmonic motion of the buggy 202 by moving through 180° rotation and there is smooth acceleration of the transfer bar system 44 to mid stroke and smooth deceleration to the end of the second pitch stroke. Return drive is a reverse of that above-described.

By virtue of the above-described mechanical transfer drive 42, a two pitch drive is attained with lost cost components adaptable to existing bar/lug type transfer systems. The drive is accomplished by unequal length crank arms on a single drive arm and the cam slot arrangement produces a buggy travel having a start-stop-start-stop sequence wherein a first set of pallets is transferred through a first index and then a second set of pallets is engaged to transfer both sets through a shorter index.

While the embodiment of the present invention, as herein disclosed, constitutes a preferred form, it is to be understood that other forms might be adopted.

What is claimed is:

1. In a mechanical transfer machine having a long transfer bar with solid lugs and latch lugs automatically engaged with first and second sets of pallets throughout the full period of each of two distinct transfer pitches, an improved two pitch mechanical drive comprising: a drive buggy means, power transfer means including two-speed electric motor means, means including a single rotatable drive arm for connecting said drive buggy means to said power transfer means, means for conditioning said two-speed electric motor means to rotate said drive arm at a high speed through a first harmonic cycle in which said drive buggy means and one of the sets of pallets is moved from a stop position, accelerated to a first mid-stroke position and decelerated to a first end stroke position, said two-speed electric motor means being conditioned to operate at a lower speed during such deceleration before said drive buggy means reaches the first end stroke position, and means to condition said electric motor means to drive said drive arm through a second harmonic cycle in which said drive buggy means and both sets of pallets are moved from a stop position, accelerated to a second mid-stroke position and decelerated to a second end stroke position, said two-speed electric motor means being conditioned to operate at a lower speed during such deceleration in the second harmonic cycle before said drive buggy means reaches the second end stroke position, and means to condition said electric motor means to drive said drive arm in reverse direction during return motion of said drive buggy means.

2. In a mechanical transfer machine having a long transfer bar and means to selectively couple first and second sets of work transfer pallets to the bar the improvement comprising: a mechanical drive having a movable buggy adapted to be connected to the transfer bar, means for supporting said buggy for opposite reciprocation, electric motor means, power transmission means connected to said electric motor means, said power transmission means including an output shaft, a single rotatable drive arm connected to said output shaft, said drive arm having opposite ends, a roller secured at each opposite end, means for selectively coupling and decoupling one of said rollers with said buggy to produce a first harmonic advance of said buggy through a first stroke to move a first set of pallets connected to the transfer bar, and means for coupling and decoupling the other of said roller cams with said buggy to produce a second harmonic advance of said buggy through a second stroke to move a second set of pallets connected to the transfer bar.

3. A mechanical drive system for advancing a transfer bar of a transfer machine through first and second strokes of predetermined length each stroke having a start and stop position comprising:
   an electric drive motor, power transmission means for producing a gear reduction of the output speed of said electric motor and including an output shaft,
   a transfer buggy, means for supporting said transfer buggy for reciprocation, a single, rotatable drive arm connected to said output shaft, cam roller means on opposite ends of said drive arm and cam track means on said transfer buggy selectively engaged by said cam roller means to produce a two pitch advance of said buggy during each revolution of drive arm travel whereby said buggy is transferred a long distance by the sum of shorter lengths.

* * * * *